United States Patent
Kim (10) Patent No.: US 8,387,959 B2
(45) Date of Patent: Mar. 5, 2013

(54) STRUCTURE OF ORIFICE PLATE FOR ENGINE MOUNT FILLED WITH MAGNETORHEOLOGICAL FLUID

(75) Inventor: Jang-Ho Kim, Bucheon-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/295,939

(22) Filed: Nov. 14, 2011

(65) Prior Publication Data

US 2012/0132306 A1 May 31, 2012

(30) Foreign Application Priority Data

Nov. 29, 2010 (KR) ........................ 10-2010-0119372

(51) Int. Cl.
 *F16F 6/00* (2006.01)
(52) U.S. Cl. ............ 267/140.14; 267/140.15; 188/267.2
(58) Field of Classification Search ............. 267/140.14–140.15; 188/267.2
See application file for complete search history.

(56) References Cited

U.S. PATENT DOCUMENTS

| | | | |
|---|---|---|---|
| 6,412,761 B1 * | 7/2002 | Baudendistel et al. | .. 267/140.14 |
| 6,622,995 B2 * | 9/2003 | Baudendistel et al. | .. 267/140.14 |
| 7,070,708 B2 * | 7/2006 | Iyengar et al. | ............. 252/62.52 |
| 8,100,388 B2 * | 1/2012 | Lee et al. | ................. 267/140.14 |
| 2002/0171186 A1 | 11/2002 | Baudendistel et al. | |
| 2012/0006635 A1 * | 1/2012 | Gade et al. | ................. 188/267.2 |

FOREIGN PATENT DOCUMENTS

| | | |
|---|---|---|
| JP | 5-1739 A | 1/1993 |
| JP | 2002-206589 A | 7/2002 |
| JP | 2004-301333 A | 10/2004 |

* cited by examiner

*Primary Examiner* — Ramon Barrera
(74) *Attorney, Agent, or Firm* — Morgan, Lewis & Bockius LLP (57) ABSTRACT

A structure of an orifice plate for an engine mount filled with a magnetorheological ("MR") fluid may include a core of which a center part may be formed at the center thereof and a blade part may be formed with a plurality of blades protruding in a radial direction from an outer periphery of the center part, and a coil assembly enclosing the outer periphery of the center part and wired up, wherein a gap may be formed between the blades so as to allow the MR fluid to flow between the blades and the coil assembly applied with current magnetizes adjacent blades to have different polarities.

11 Claims, 6 Drawing Sheets

PLAN VIEW

BOTTOM VIEW

Fig. 6

Fig. 7

STRUCTURE OF ORIFICE PLATE FOR ENGINE MOUNT FILLED WITH MAGNETORHEOLOGICAL FLUID

CROSS-REFERENCE TO RELATED APPLICATIONS

The present application claims priority to Korean Patent Application No. 10-2010-119372, filed on Nov. 29, 2010, the entire contents of which is incorporated herein for all purposes by this reference.

BACKGROUND OF THE INVENTION

1. Field of the Invention

The present invention relates to a structure of an orifice plate for an engine mount filled with a magnetorheological ("MR") fluid, and more particularly, to a structure of an orifice plate in which magnetic field is formed in a perpendicular direction in an entire channel in which the magnetorheological fluid flows so as to efficiently control a flow of the magnetorheological fluid filled in the engine mount.

2. Description of Related Art

An engine is installed in an engine room of a vehicle body through an engine mount to attenuate vibration generated from the engine. As the engine mount, a rubber mount using inertia force of a material and a hydro-mount filled with liquid therein and attenuating vibration as an inertia effect of the liquid are primarily widely used.

Between them, the hydro engine mount is configured to attenuate vibrations in a high frequency domain and a low frequency domain to be widely used in various vehicle types.

In the hydro engine mount, a hydro liquid is received in an internal space where an insulator and a diaphragm are formed, however, an orifice plate is mounted on the internal space, which is partitioned into an upper fluid chamber and a lower fluid chamber.

The orifice plate has an annular channel in which the hydro liquid flows to the inside along on a border thereof and may additionally have a decoupler mounted on the center thereof. In addition, a stud coupled with the insulator is coupled with a bracket of the engine. Therefore, when the insulator made of an inertia material is repetitively inertially compressed and restored depending on a weight applied to the stud, the hydro liquid flows to the upper fluid chamber and the lower fluid chamber through the channel. The flow of the hydro liquid vibrates the decoupler, however, the vibration of the high frequency domain is attenuated by the vibration of the decoupler and the vibration of the low frequency domain is attenuated by the flow of the hydro liquid through the channel.

Meanwhile, the hydromount may be filled with an MR fluid instead of the general hydro liquid. The magnetorheological fluid as suspension in which smooth particles having magnetism are mixed with a synthetic hydrocarbon liquid has shear stress that varies depending on the intensity of a magnetic field formed therearound.

Accordingly, the hydromount filled with the MR fluid is configured to control dynamic stiffness and an attenuation characteristic of the mount according to an operation condition of a vehicle by additionally installing a coil to the orifice plate and controlling application of current to the coil so as to form the magnetic field around the channel through which the MR fluid passes.

Figure 1A:
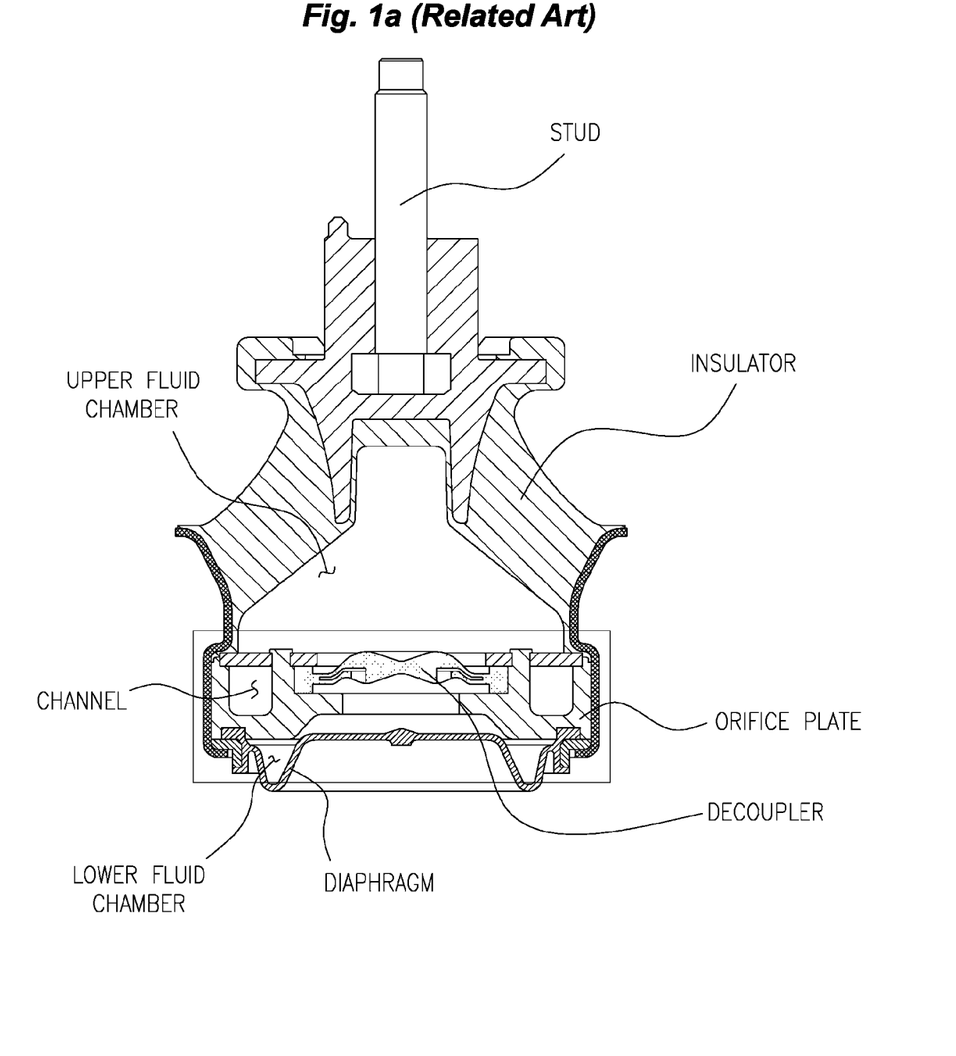
FIG. 1A is a cross sectional view of a hydromount filled with a general hydro liquid.
Figure 1B:
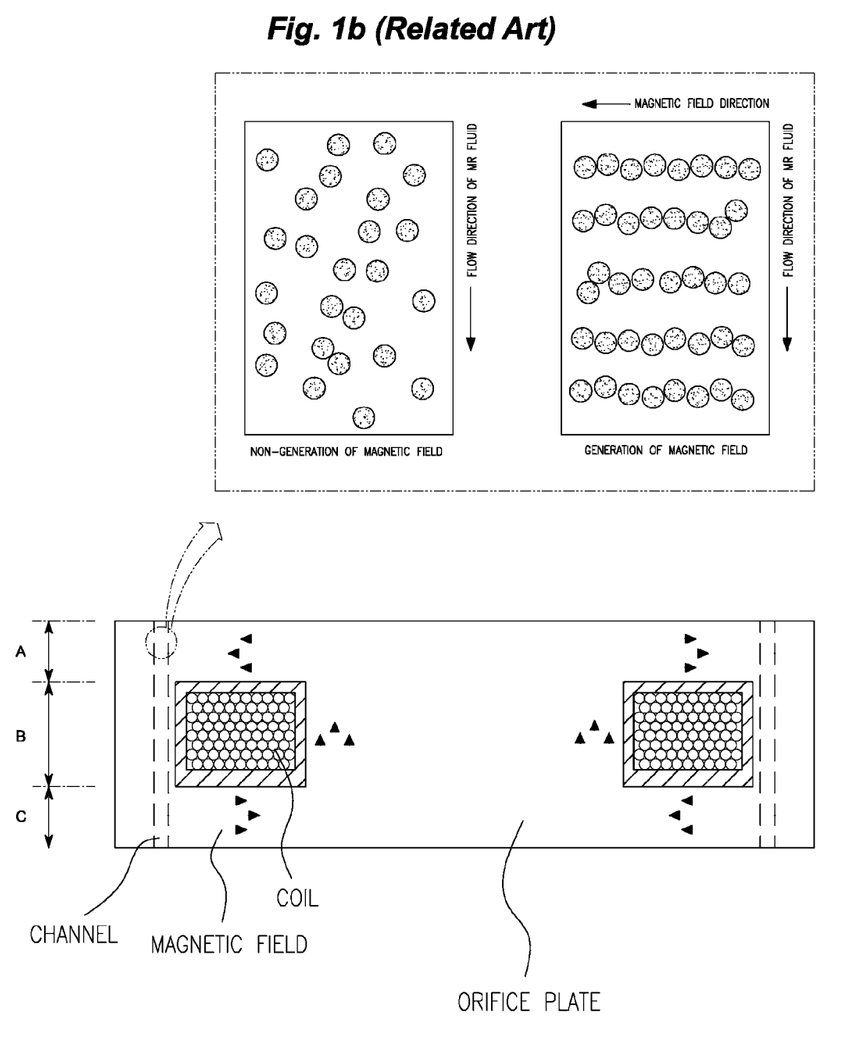
FIG. 1B is a cross sectional view of an orifice plate used to a hydromount filled with an MR fluid and a partial enlarged view showing an image in which particles of the MR fluid are arranged according to generation of a magnetic field.

Meanwhile, a control method of the MR fluid in the related art is shown in FIG. 1B. The orifice plate in the related art has a structure in which a channel opened vertically is installed so that the MR fluid flows to the upper fluid chamber and the lower fluid chamber, however, the coil is mounted to be positioned at one side of the channel and the flow of the MR fluid is controlled by applying the current to the coil.

The MR fluid has a flowing characteristic similar as a general hydro liquid when the magnetic field is not formed therearound, however, when the magnetic field is formed therearound, particles form a line, such that the MR fluid has a changed flowing characteristic. That is, when the magnetic field is not formed, the shear stress of the MR fluid is calculated by a value acquired by multiplying viscosity and a shear rate by each other, however, when the magnetic field is formed, the shear stress of the MR fluid is calculated by adding breakdown shear stress to the multiplying value the viscosity and the shear rate. The breakdown shear stress increases in proportion to the intensity of the applied magnetic field.

However, as shown in FIG. 1B, a flow direction of the MR fluid and a forming direction of the magnetic field should be perpendicular to each other in order to arrange the particles in the MR fluid to be perpendicular to the flow direction.

In the know method, the coil is arranged at one side of the channel at a predetermined interval, and in section "A" and section "C", the magnetic field is perpendicular to the flow direction of the MR fluid, but in section "B", the magnetic field is formed in a direction parallel to (the flow direction of the MR fluid), thereby deteriorating control efficiency. That is, in section "A" and section "C", the magnetic field passes through the MR fluid while being perpendicular to the flow direction of the MR fluid, but in section "B", the magnetic field is formed in a direction parallel to the flow direction of the MR fluid and does not thus pass through the MR fluid, and as a result, the control efficiency deteriorates.

Therefore, the deteriorated control efficiency is restored by increasing a current value applied to the coil or further lengthening the channel, but the restored control efficiency causes the volume to be increased and a caloric value to be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of an orifice plate that can solve the problems and control a flowing characteristic of the MR fluid more efficiently.

In an aspect of the present invention, a structure of an orifice plate for an engine mount filled with a magnetorheological ("MR") fluid, may include a core of which a center part may be formed at the center thereof and a blade part may be formed with a plurality of blades protruding in a radial direction from an outer periphery of the center part, and a coil assembly enclosing the outer periphery of the center part and wired up, wherein a gap may be formed between the blades so as to allow the MR fluid to flow between the blades and the coil assembly applied with current magnetizes adjacent blades to may have different polarities.

The structure may further include an outer ring having a ring shape and as a nonmagnetic material in which the blade part may be fixed in an inner periphery of the outer ring, wherein a second outer ring having a diameter smaller than the outer ring may be connected to an inner periphery of the center part having a ring shape, and wherein a second core and a second coil assembly enclosing the second core, which may have the same construction as the core and the coil assembly, may be mounted to an inner periphery of the second outer ring.

The core may include an upper core having an upper center part formed at the center thereof and being in a ring shape, wherein a plurality of upper blades may be mounted in a radial direction in an outer periphery of the upper center part with a predetermined space therebetween and bent downwards, and a lower core having a lower center part formed at the center thereof and being in a ring shape, wherein a plurality of lower blades may be mounted in a radial direction in an outer periphery of the lower center part with a predetermined space therebetween, and may be bent upwards, wherein the upper center part and the lower center part may be connected each other in a co-axial direction thereof and enclosed by the coil assembly, wherein the upper center part and the lower center part constitutes the center part, and wherein a lower blade may be disposed between two adjacent upper blades to configure the blade part.

In the upper blades, a lower groove opened downwards may be formed in a ring shape along a circumferential direction of the upper center part, and in the lower blades, an upper groove opened upwards may be formed in a ring shape along a circumferential direction of the upper center part, and the coil assembly having a ring shape may be mounted between the lower groove and the upper groove along outer peripheries of the upper and lower center parts.

The coil assembly may be connected with a cover as a nonmagnetic material, wherein the cover may have a ring shape and an inner periphery thereof may be open.

By shielding the inner periphery of the center part with an additional component made of a nonmagnetic material, a flow route of the MR fluid may be confined to the channel formed between the blades. The decoupler in the related art may be just installed without shielding the inner periphery of the center part and the orifice plate according to the exemplary embodiment of the present invention which has the same configuration so as to more effectively provide a function (high frequency vibration attenuating function similar to the decoupler in the related art, however, has a diameter smaller than the decoupler in the related art may be additionally installed. That is, a second outer ring having a diameter smaller than the outer ring may be connected to the inner periphery of the center part having a ring shape, however, a second core and a second coil assembly which have the same constitution as the core and the coil assembly may be mounted to the inner periphery of the second outer ring.

According to exemplary embodiments of the present invention, it is possible to more efficiently control a flow characteristic of an MR fluid by inducing generation of a magnetic field so as to be perpendicular to a flow direction of the MR fluid in all portions of a channel in which the MR fluid flows.

Therefore, since it is possible to solve problems such as increase in caloric value and increase in volume in the related art by operating by relatively low current or shortening a channel length. In addition, an upper core and a lower core have a symmetric shape to implement easy production and an entire shape thereof is a ring shape and a plurality of orifice plates are installed at the inner side or/and the outer side thereof to thereby control the MR fluid more delicately.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An orifice plate according to an exemplary embodiment of the present invention is mounted on an engine mount filled with an MR fluid to partition an upper fluid chamber and a lower fluid chamber between an insulator and a diaphragm and is electrically connected with a battery of a vehicle and a controller controlling current supply so as to form a magnetic field according to current application. Since the MR fluid varies in proportion to the intensity of the magnetic field and the intensity of the magnetic field is proportional to current applied to a coil, the controller controls the current supply applied to the coil, however, operates according to a control algorism considering a vehicle traveling state such as a engine rpm, a vehicle speed, and the like.

Hereinafter, an orifice plate for an engine mount filled with the MR fluid according to an exemplary embodiment of the present invention will be described in more detail with reference to the accompanying drawings.

Figure 2:
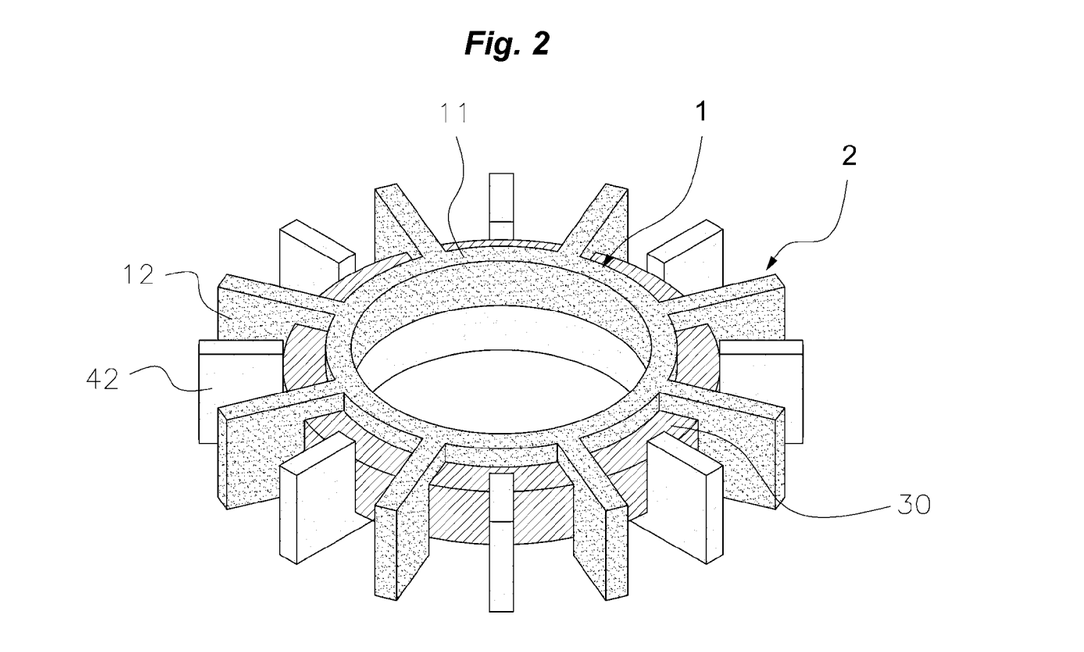
FIG. 2 is a perspective view of an orifice plate according to an exemplary embodiment of the present invention.

Referring to FIG. 2, the orifice plate according to the exemplary embodiment of the present invention is formed to connect a core with a coil assembly. The core includes a center part 1 having a ring shape (alternatively, a disk shape) at the center and a blade part 2 in which a plurality of blades 12 and 42 protrude in a radial form from an outer periphery of the center part 1.

In addition, the coil assembly 20 connected with a cover 30 is connected to the outer periphery of the center part 1 and wired up so that each of the blades 12 and 42 is magnetized. The blades 12 and 42 are disposed to be spaced apart from each other with a predetermined interval so that the MR fluid flows vertically. Further, the coil assembly 20 receives current from the battery of the vehicle (through the controller) and magnetizes the adjacent blades 12 and 42 so as to be continually repeated with different polarities, that is, an N polarity and an S polarity.

Figure 3:
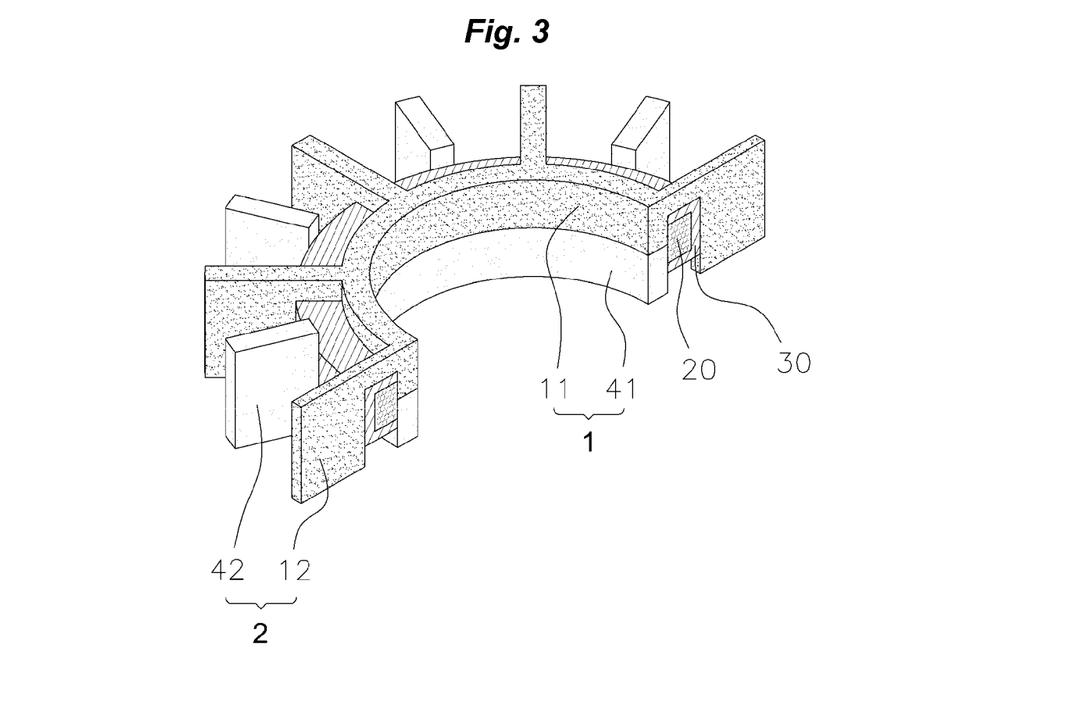
FIG. 3 is a perspective view showing an image in which an orifice plate is cut according to an exemplary embodiment of the present invention.
Figure 4:
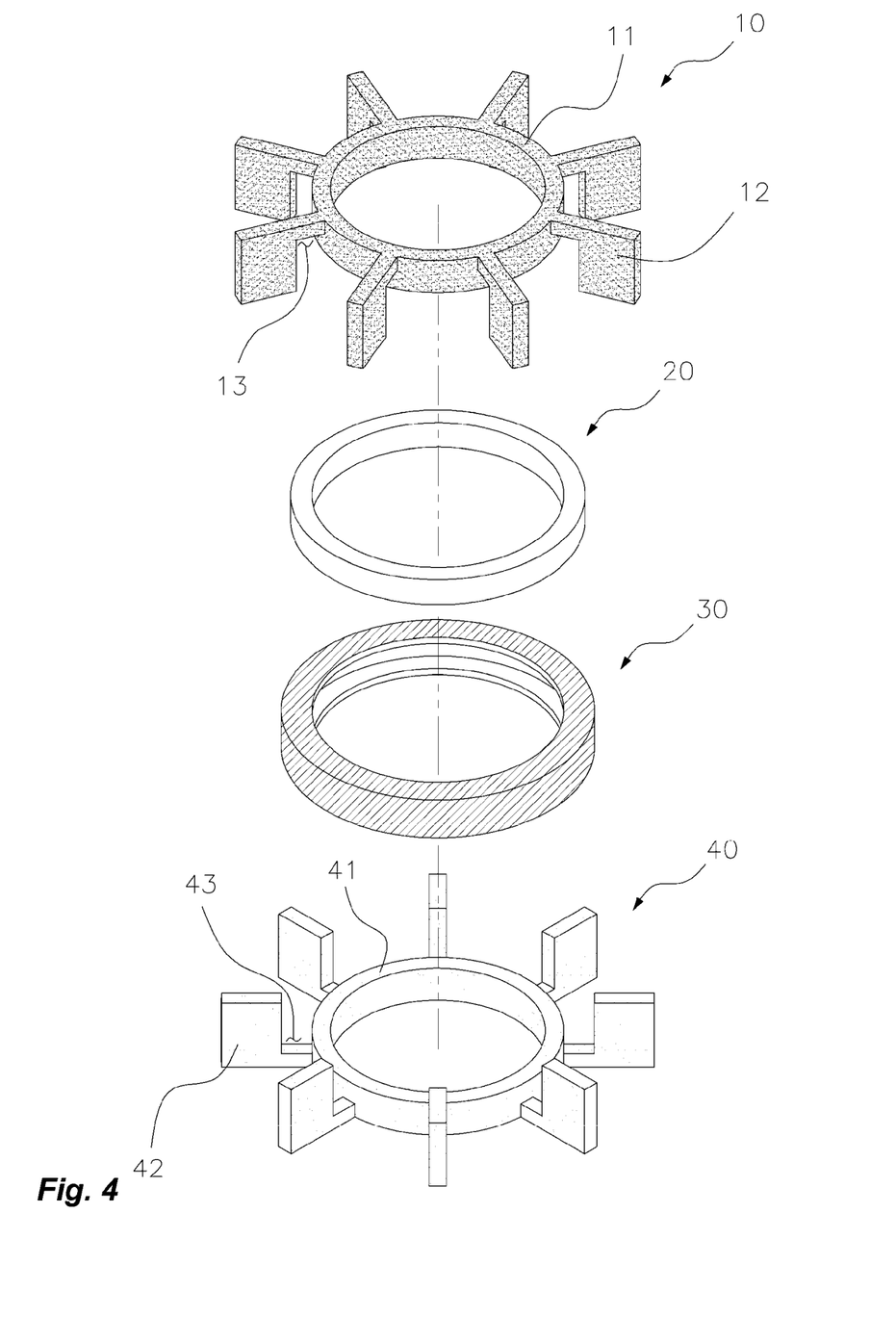
FIG. 4 is an exploded perspective view of an orifice plate according to an exemplary embodiment of the present invention.

As shown in FIGS. 3 and 4, the core is formed to connect an upper core 10 and a lower core 40 which are formed in the same (alternatively, symmetric) shape. That is, the upper core 10 includes an upper center part 11 formed in a ring shape at the center and a plurality of upper blades 12 formed in a radial form at the outer periphery and an end of the upper blade 12 has a shape bent to the lower side thereof. In addition, the lower core 40 includes a lower center part 41 formed in a ring shape at the center and a plurality of lower blades 42 formed in a radial form at the outer periphery and the lower blade 42 has a shape bent to the upper side thereof.

Therefore, the upper core 10 and the lower core 40 are vertically connected to each other so as to be disposed with one lower blade 42 between two adjacent upper blades 12 to form the blade part 2 and the upper center part 11 and the lower center part 41 are connected to each other to form the center part 1.

In addition, a lower groove 13 opened to the lower side and having a ring shape is formed in the upper blades 12 so that the coil assembly 20 having a ring shape is mounted between the upper core 10 and the lower core 40 and an upper groove 43 opened to the upper side and having a ring shape is formed in the lower blade 40.

The coil assembly 20 is mounted between the lower groove 13 and the upper groove 43 by being connected to a cover 30 as a nonmagnetic material so as not to directly contact the MR fluid (that is, so that a self-formed magnetic field does not affect the MR fluid). That is, the cover 30 has a ring shape and an inner periphery thereof is opened to shield the magnetic field generated on the surface of the coil assembly 20 so that the coil assembly 20 magnetizes the blades 12 and 42 of the upper core 10 and the lower core 40, however, the magnetic field generated from the coil assembly 20 does not directly affect the MR fluid. The coil assembly 20 is wired up to each of the upper core 10 and the lower core 40.

Figure 5:
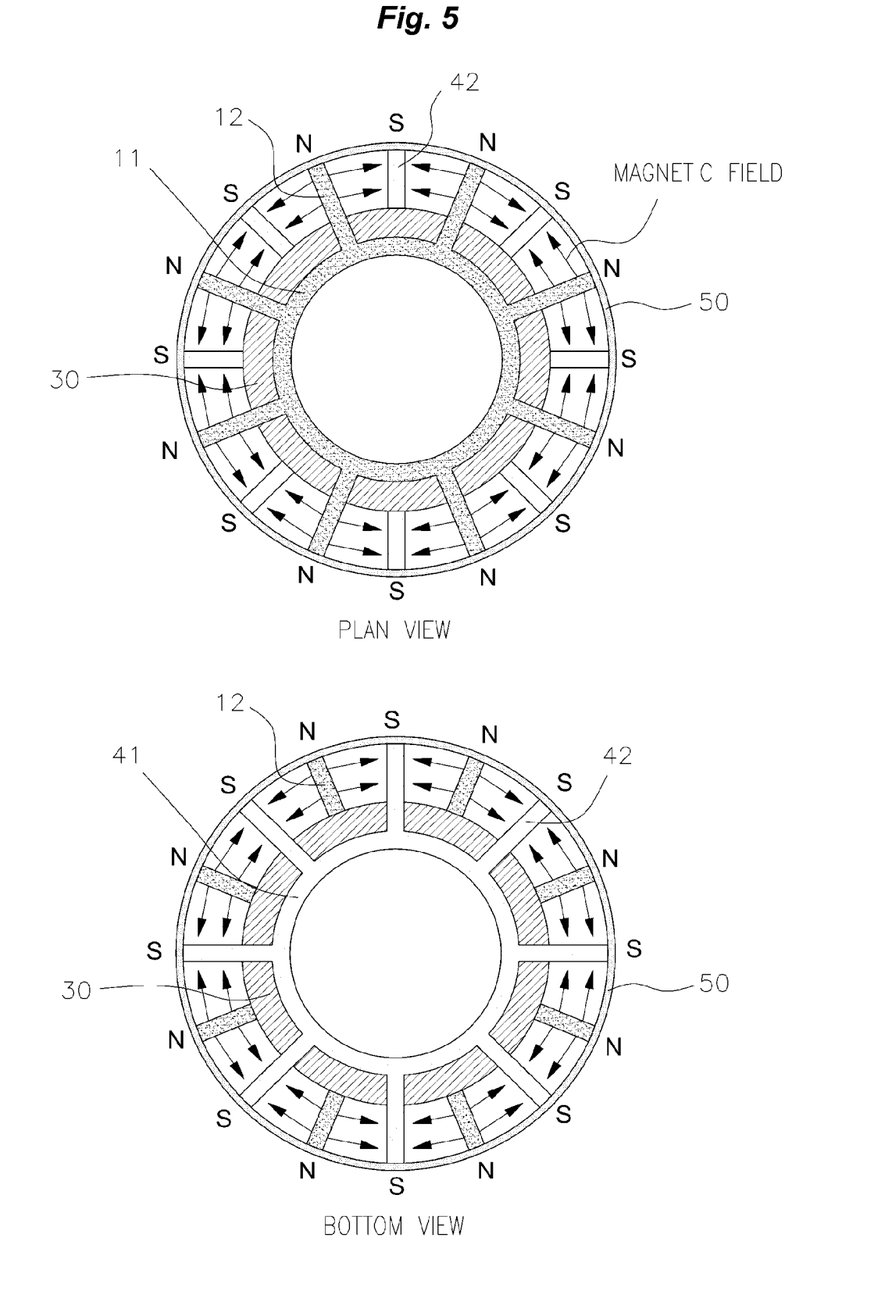
FIG. 5 is a plan view and a bottom view showing an image in which a magnetic field is formed when current is applied to a coil assembly.

Further, when the orifice plate is mounted in the engine mount, an outer ring 50 having a ring shape and as a nonmagnetic material in which the blade part 2 is fixed to an inner periphery thereof is further included so as to protect the blades 12 and 42 (and so as to shield each magnetic field formed between the adjacent blades) as shown in FIG. 5.

Figure 6:
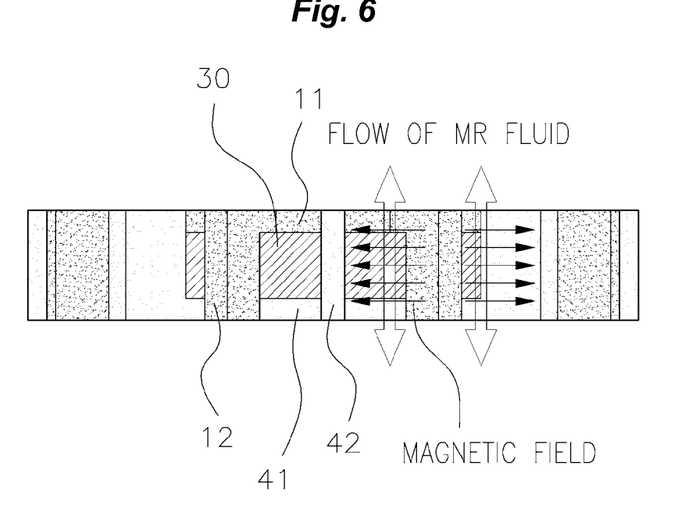
FIG. 6 is a side view showing a flow direction of an MR fluid and a generation direction of a magnetic field.

The orifice plate constituted as the above is mounted in the engine mount filled with the MR fluid with the connected outer ring 50 to partition the inner portion thereof into an upper fluid chamber and a lower fluid chamber. In addition, in the orifice plate of the exemplary embodiment of the present invention, the MR fluid flows vertically between the blades 12 and 42 according to inertial compression and restoration of the insulator, however, when current is supplied to the coil assembly 20, the magnetic field is formed in a direction marked with an arrow in FIG. 5. The magnetic field is formed to be perpendicular to the flow direction of the MR fluid as shown in FIG. 6 to change shearing stress of the MR fluid. Since dynamic stiffness and attenuation characteristics of the engine mount are determined according to variation in the shearing stress of the MR fluid, a current supply rate to the coil assembly 20 is controlled according to a vehicle traveling state, thereby providing the highest damping performance.

Meanwhile, the center part 1 of the core may be manufactured by adding an additional product having a disk shape made of a nonmagnetic material so that the MR fluid is not passed, but is formed in a ring shape such that a decoupler in the related art is additionally mounted therein, like the exemplary embodiment of the present invention.

Figure 7:
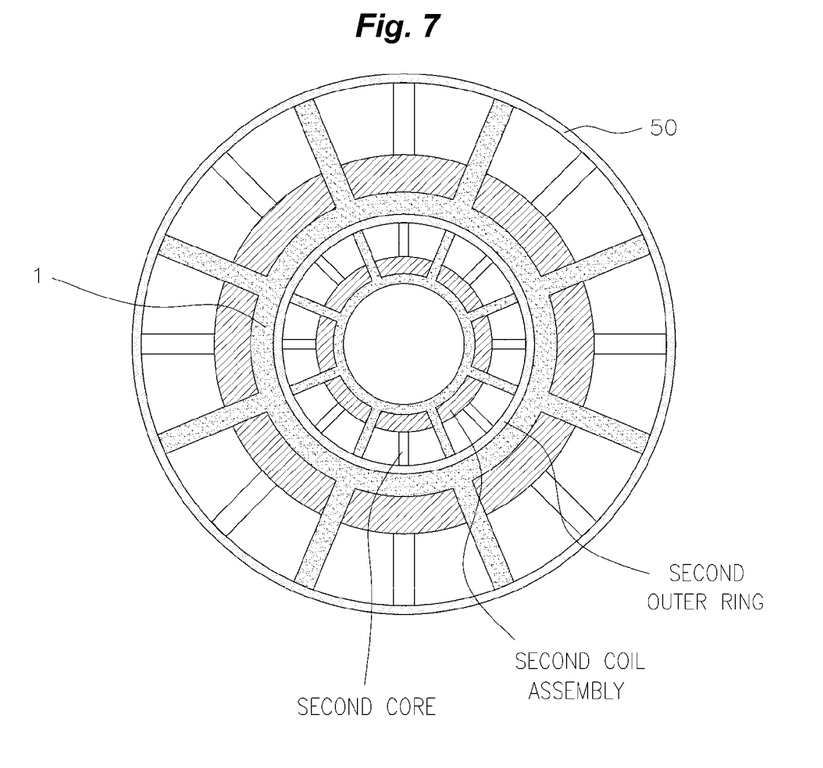
FIG. 7 is a plan view of an orifice plate according to another exemplary embodiment of the present invention.

Further, as shown in FIG. 7, a second outer ring 50a having a diameter smaller than the outer ring 50 is connected to the inner periphery of the center part 1 and a second core and a second coil assembly, which have the same constitution as the core and the coil assembly, however, have diameters smaller than the core and the coil assembly, are mounted in the inner periphery of the second outer ring, thereby attenuate more efficiently vibrations having different characteristics (vibration in a high frequency domain) such as the decoupler.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an orifice plate for an engine mount filled with a magnetorheological ("MR") fluid, comprising:
    a core of which a center part is formed at the center thereof and a blade part is formed with a plurality of blades protruding in a radial direction from an outer periphery of the center part; and
    a coil assembly enclosing the outer periphery of the center part and wired up,
    wherein a gap is formed between the blades so as to allow the MR fluid to flow between the blades and the coil assembly applied with current magnetizes adjacent blades to have different polarities.

2. The structure of the claim 1, further comprising an outer ring having a ring shape and as a nonmagnetic material in which the blade part is fixed in an inner periphery of the outer ring.

3. The structure of claim 2,
    wherein a second outer ring having a diameter smaller than the outer ring is connected to an inner periphery of the center part having a ring shape, and
    wherein a second core and a second coil assembly enclosing the second core, which have the same construction as the core and the coil assembly, are mounted to an inner periphery of the second outer ring.

4. The structure of claim 1, wherein the core includes:

an upper core having an upper center part formed at the center thereof and being in a ring shape, wherein a plurality of upper blades are mounted in a radial direction in an outer periphery of the upper center part with a predetermined space therebetween and bent downwards; and a lower core having a lower center part formed at the center thereof and being in a ring shape, wherein a plurality of lower blades are mounted in a radial direction in an outer periphery of the lower center part with a predetermined space therebetween, and are bent upwards;

wherein the upper center part and the lower center part are connected each other in a co-axial direction thereof and enclosed by the coil assembly;

wherein the upper center part and the lower center part constitutes the center part; and wherein a lower blade is disposed between two adjacent upper blades to configure the blade part.

5. The structure of the claim 4, further comprising an outer ring having a ring shape and as a nonmagnetic material in which the blade part is fixed in an inner periphery of the outer ring.

6. The structure of claim 5, wherein a second outer ring having a diameter smaller than the outer ring is connected to an inner periphery of the center part having a ring shape, and wherein a second core and a second coil assembly enclosing the second core, which have the same construction as the core and the coil assembly, are mounted to an inner periphery of the second outer ring.

7. The structure of claim 4, wherein in the upper blades, a lower groove opened downwards is formed in a ring shape along a circumferential direction of the upper center part;

wherein in the lower blades, an upper groove opened upwards is formed in a ring shape along a circumferential direction of the upper center part; and wherein the coil assembly having a ring shape is mounted between the lower groove and the upper groove along outer peripheries of the upper and lower center parts.

8. The structure of claim 7, wherein the coil assembly is connected with a cover as a nonmagnetic material.

9. The structure of claim 7, wherein the cover has a ring shape and an inner periphery thereof is open.

10. The structure of the claim 8, further comprising an outer ring having a ring shape and as a nonmagnetic material in which the blade part is fixed in an inner periphery of the outer ring.

11. The structure of claim 10, wherein a second outer ring having a diameter smaller than the outer ring is connected to an inner periphery of the center part having a ring shape, and wherein a second core and a second coil assembly enclosing the second core, which have the same construction as the core and the coil assembly, are mounted to an inner periphery of the second outer ring.

* * * * *